United States Patent
Hata

(10) Patent No.: US 9,996,250 B2
(45) Date of Patent: Jun. 12, 2018

(54) TOUCH MOTION MOBILE DEVICE, DISPLAY CONTROL PROGRAM, AND DISPLAY CONTROL METHOD

(71) Applicant: KYOCERA Corporation, Fushimi-ku, Kyoto-shi, Kyoto (JP)

(72) Inventor: Takashi Hata, Osaka (JP)

(73) Assignee: KYOCERA Corporation, Kyoto (JP)

( * ) Notice: Subject to any disclaimer, the term of this patent is extended or adjusted under 35 U.S.C. 154(b) by 288 days.

(21) Appl. No.: 14/451,334

(22) Filed: Aug. 4, 2014

(65) Prior Publication Data
US 2014/0380189 A1   Dec. 25, 2014

Related U.S. Application Data

(63) Continuation of application No. 12/978,025, filed on Dec. 23, 2010, now abandoned.

(30) Foreign Application Priority Data

Dec. 24, 2009   (JP) .................................. 2009-293421

(51) Int. Cl.
*G06F 3/0488* (2013.01)
*H04L 12/58* (2006.01)
(Continued)

(52) U.S. Cl.
CPC .......... *G06F 3/0488* (2013.01); *G06F 1/1681* (2013.01); *G06F 1/1692* (2013.01);
(Continued)

(58) Field of Classification Search
CPC .... G06F 1/1681; G06F 1/1692; G06F 3/0485; G06F 3/0488; G06F 3/04883; G06F 3/04886; H04L 51/08
See application file for complete search history.

(56) References Cited

U.S. PATENT DOCUMENTS

| | | | | |
|---|---|---|---|---|
| 5,467,102 A | * | 11/1995 | Kuno | .................... G06F 1/1618 |
| | | | | 345/1.3 |
| 6,243,645 B1 | * | 6/2001 | Moteki | .................. G01C 21/26 |
| | | | | 340/988 |

(Continued)

FOREIGN PATENT DOCUMENTS

| | | |
|---|---|---|
| JP | 06-044001 A | 2/1994 |
| JP | 2007-240964 A | 9/2007 |
| KR | 10-2007-0023350 A | 2/2007 |

OTHER PUBLICATIONS

Office Action dated Jan. 30, 2010 issued in counterpart Korean application No. 10-2010-0134353.

*Primary Examiner* — Amy Ng
*Assistant Examiner* — Tan H Tran
(74) *Attorney, Agent, or Firm* — Procopio Cory Hargreaves and Savitch LLP

(57) ABSTRACT

A mobile device comprising a first touch panel and a second touch panel for displaying images is disclosure. A decision module is operable to indicate a touch condition, if a touch position on a first touch panel is changed to a predefined direction toward a second touch panel, and if a touch is detected on both the first touch panel and the second touch panel. A display control module is operable to display at least some of an image displayed on the second touch panel on the first touch panel in response to the touch condition.

9 Claims, 9 Drawing Sheets

(51) Int. Cl.
*G06F 1/16* (2006.01)
*G06F 3/0485* (2013.01)

(52) U.S. Cl.
CPC ........ *G06F 3/0485* (2013.01); *G06F 3/04883* (2013.01); *G06F 3/04886* (2013.01); *H04L 51/08* (2013.01)

(56) References Cited

U.S. PATENT DOCUMENTS

| | | |
|---|---|---|
| 6,545,669 B1 | 4/2003 | Kinawi et al. |
| 2002/0151283 A1* | 10/2002 | Pallakoff ................ G06F 3/14 455/575.1 |
| 2006/0101354 A1* | 5/2006 | Hashimoto ......... G06F 3/04845 715/863 |
| 2007/0075915 A1 | 4/2007 | Cheon et al. |
| 2010/0066698 A1* | 3/2010 | Seo ................... G06F 3/04883 345/173 |
| 2010/0295802 A1 | 11/2010 | Lee |
| 2011/0018821 A1 | 1/2011 | Kii |
| 2011/0090155 A1 | 4/2011 | Caskey et al. |
| 2011/0107272 A1* | 5/2011 | Aguilar ............... G06F 3/04815 715/853 |

* cited by examiner

Fig.8
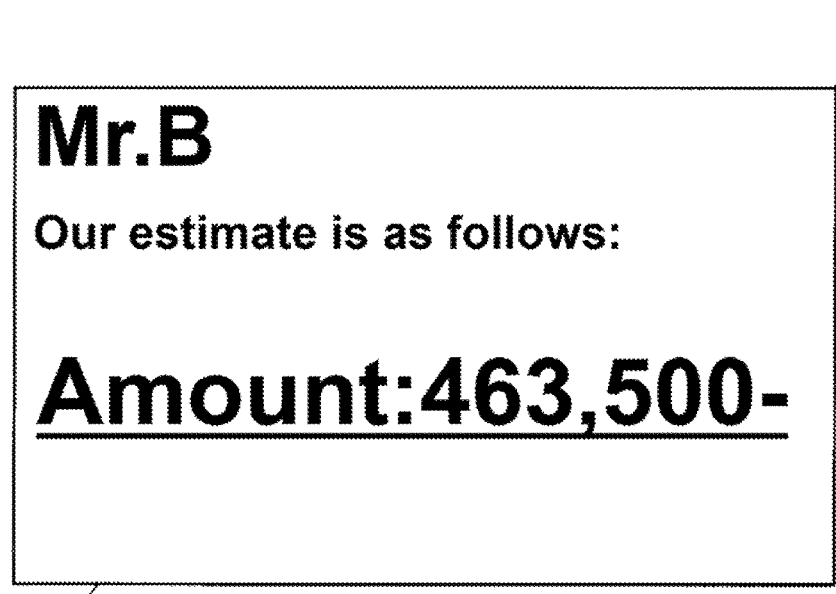
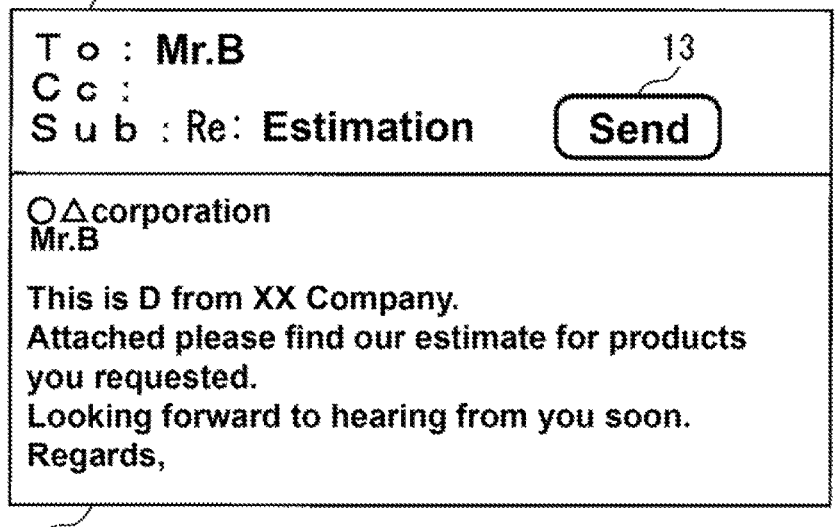

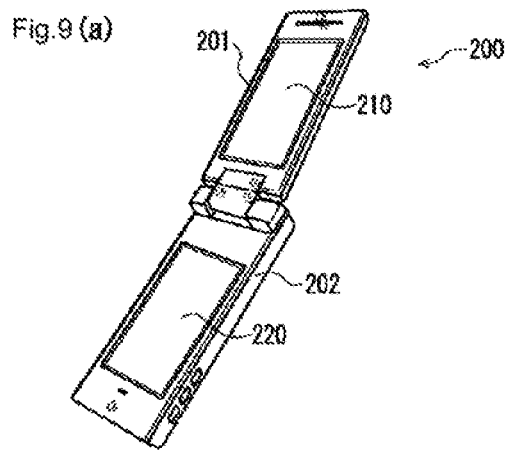
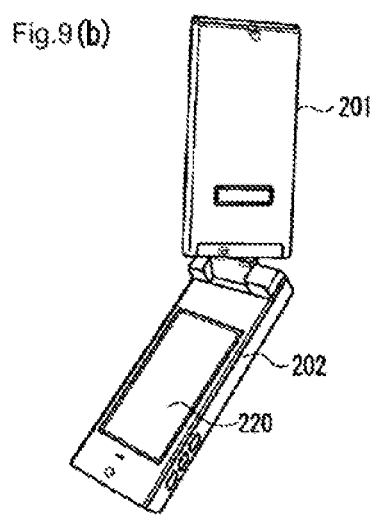
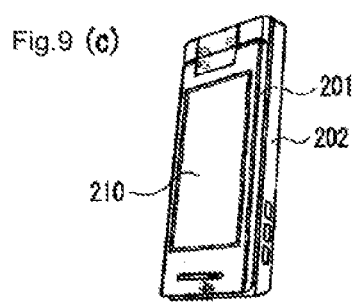

TOUCH MOTION MOBILE DEVICE, DISPLAY CONTROL PROGRAM, AND DISPLAY CONTROL METHOD

CROSS-REFERENCE TO RELATED APPLICATION

The present application is a continuation of U.S. patent application Ser. No. 12/978,025 filed Dec. 23, 2010 which claims priority under 35 U.S.C. § 119 to Japanese Patent Application No. 2009-293421, filed on Dec. 24, 2009, entitled "MOBILE DEVICE AND DISPLAY CONTROL PROGRAM". The content of each of the above referenced patent applications is incorporated by reference herein in its entirety.

FIELD

Embodiments of the present disclosure relate to mobile devices such as cell phones comprising a plurality of touch panels, and more particularly relate to enhancements to a user interface of cell phones comprising a plurality of touch panels.

BACKGROUND

Mobile devices that perform processing based on inputs via two touch panels are known. Moreover, there are mobile devices that enhance their portability by opening and/or closing to change shape, such as a sliding type. For such mobile devices, in a closed state, a size of their housings can be reduced. When a mobile device comprising two touch panels A and B is of the sliding type, the state of the mobile device can change from a closed state to an open state, and each of the touch panels can be arranged such that the two touch panels A and B are visible. When the state changes from an open state to a closed state, only the touch panel A is visible and the respective touch panels can be arranged such that the touch panel B is hidden in a background.

With such a mobile device, when a user is looking at images displayed on the two touch panels, namely A and B, in an open state the user may think the display is sufficient as long as he/she can continue looking at the image on the touch panel A only, and the mobile device can reduce the size by changing the state into a closed state. However, if the user wants to continue looking at the image on the touch panel B only, there may be a problem in which the mobile device cannot reduce its size by changing its state to a closed state.

Moreover, even when the mobile device is of a straight type, with no changes in the state due to closing/opening, a problem may arise, for example, when there is a difference in the performance between the touch panels A and B, etc. The difference in the performance may comprise, for example but without limitation, the size of display areas, the difference in display colors (full color and monochromatic), and the like. However, there may be a problem in which images displayed on low-performance touch panels cannot be enlarged or displayed in full color, unlike images displayed on high-performance touch panels.

SUMMARY

A mobile device comprising a first touch panel and a second touch panel for displaying images is disclosure. A decision module is operable to indicate a touch condition, if a touch position on a first touch panel is changed to a predefined direction toward a second touch panel, if a touch is detected on both the first touch panel and the second touch panel. A display control module is operable to display at least some of an image displayed on the second touch panel on the first touch panel in response to the touch condition.

In an embodiment, a mobile device comprises a first touch panel and a second touch panel for displaying images. A decision module is operable to indicate a touch condition, if a touch position on a first touch panel is changed to a predefined direction toward a second touch panel, and if a touch is detected on both the first touch panel and the second touch panel. A display control module is operable to display at least some of an image displayed on the second touch panel on the first touch panel in response to the touch condition.

In another embodiment, a display control method for a mobile device comprising a first touch panel and a second touch panel for displaying images. A touch condition is indicated, if a touch position on a first touch panel is changed to a predefined direction toward a second touch panel, and if a touch is detected on both the first touch panel and the second touch panel. At least some of an image is displayed on the second touch panel on the first touch panel in response to the touch condition.

In yet another embodiment, a computer readable medium comprising program code for operating a mobile device comprising a first touch panel and a second touch panel for displaying images. The program code comprises indicating a touch condition, if a touch position on a first touch panel is changed to a predefined direction toward a second touch panel, and if a touch is detected on both the first touch panel and the second touch panel. The program code comprises displaying at least some of an image displayed on the second touch panel on the first touch panel in response to the touch condition.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 1 (b) is a perspective view showing a cell phone in an open state.

FIG. 1 (c) is a front view showing the appearance of a cell phone in an open state.

FIG. 8 is the screens to be displayed on each touch panel of a cell phone after the interchange operation.

FIG. 9 (a) is a perspective view showing the folding-type cell phone in a open state.

FIG. 9 (b) is a perspective view showing the folding-type cell phone in a open state.

FIG. 9 (c) is a perspective view showing the folding-type cell phone in a closed state.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, a mobile phone. Embodiments of the disclosure, however, are not limited to such mobile phones, and the techniques described herein may also be utilized in other applications. For example, embodiments may be applicable to, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A cell phone is described below as an embodiment of a mobile phone/device according to the present disclosure.

A cell phone 100 comprises two touch panels. Using the two touch panels, as a user performs a specific operation (hereinafter referred to as "interchange operation"), images displayed on the respective touch panel are interchanged with each other and displayed on the respective touch panel.

Figure 1:
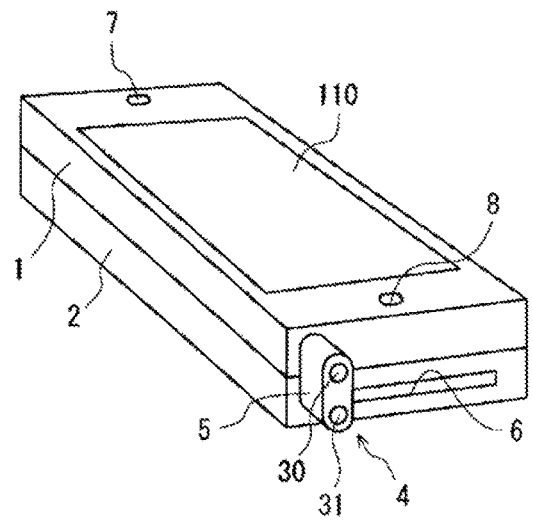
FIG. 1 (a) is a perspective view showing a cell phone in a closed state.
Figure 1:
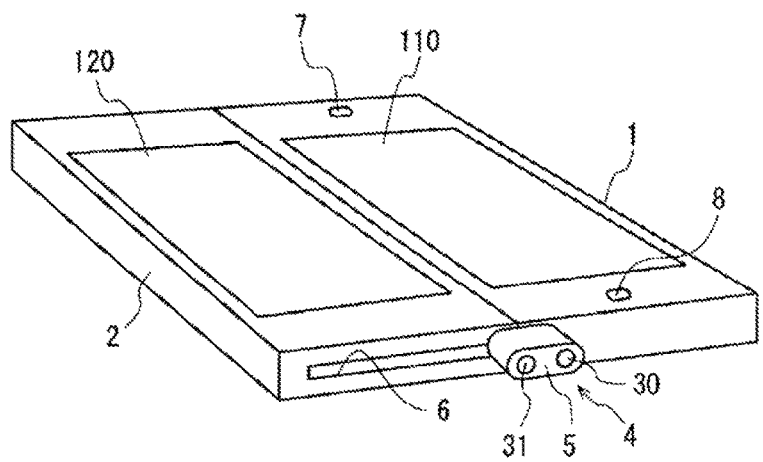
Figure 1:
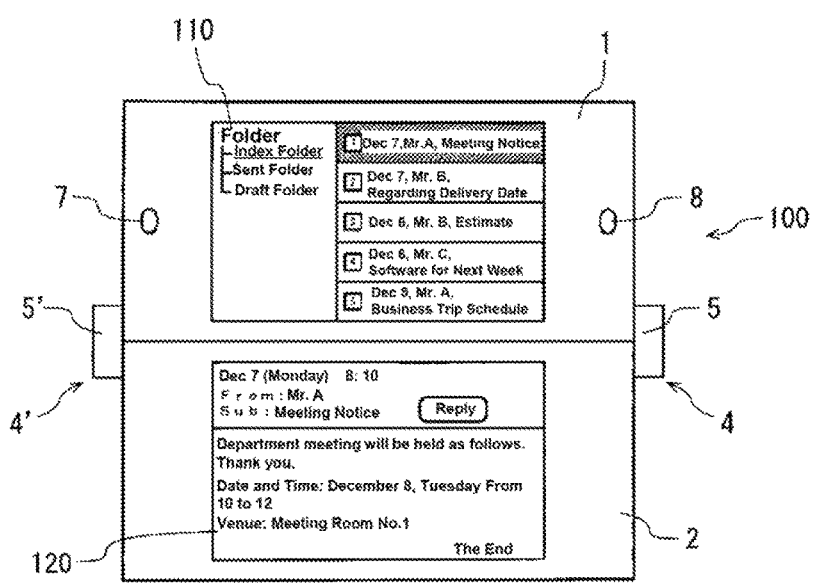

FIG. 1 (a) is a perspective view showing the cell phone 100 in a closed state. FIG. 1 (b) is a perspective view showing the cell phone 100 in an open state. FIG. 1 (c) is a front view showing the appearance of the cell phone 100 in an open state.

As shown in FIG. 1 (a)-(c), the cell phone 100 is of a sliding-type wherein a first housing 1 and a second housing 2 can move relative to each other. The first housing 1 and the second housing 2 are coupled to connection mechanisms 4 and 4'.

The first housing 1 comprises a touch panel 110, a speaker 7, and a microphone 8. The second housing 2 comprises a touch panel 120.

As shown in the FIGS. 1(a) and (b), the connection mechanism 4 comprises, a connection piece 5 and pins 30 and 31 for connecting the side surface of the first housing 1 and the side surface of the second housing 2 with each other. The connection mechanism 4' also comprises a connection piece 5' and pins 30' and 31' for connecting the side surface of the first housing 1 and the side surface of the second housing 2 with each other. Here, the pins 30' and 31' are not shown in the Figures. The pins 30 and 30' are pivoted on the first housing 1. The pins 31 and 31' are slidably engaged into the second housing 2.

As shown in FIGS. 1 (a) and (b), on the side surface of the second housing 2 comprising the connection mechanism 4, a guide trough 6 is installed such that the pin 31 becomes slidable. On the side surface of the second housing 2 comprising the connection mechanism 4' as well, in a similar fashion, a guide trough 6' is installed such that the pin 31' becomes slidable.

As shown in FIG. 1 (a), the cell phone 100 in a closed state in which the first housing 1 is overlapped on the second housing 2 so as to make the touch panel 120 invisible, as the pins 31 and 31' slide along the guide trough 6 and 6' with the connection mechanisms 4 and 4', the first housing 1 moves along the surface of the second housing 2. Subsequently, as the pins 30 and 30' rotate around the pins 31 and 31' respectively, as shown in Fig (b) and (c), it reaches an open state in which the surface of the first housing 1 and the surface of the second housing 2 are aligned on a nearly same plane, thus, the touch panels 110 and 120 become visible.

Next, an example of operation to interchange screens displayed on the two touch panels is described with reference to FIG. 2 and FIG. 3.

Figure 2:
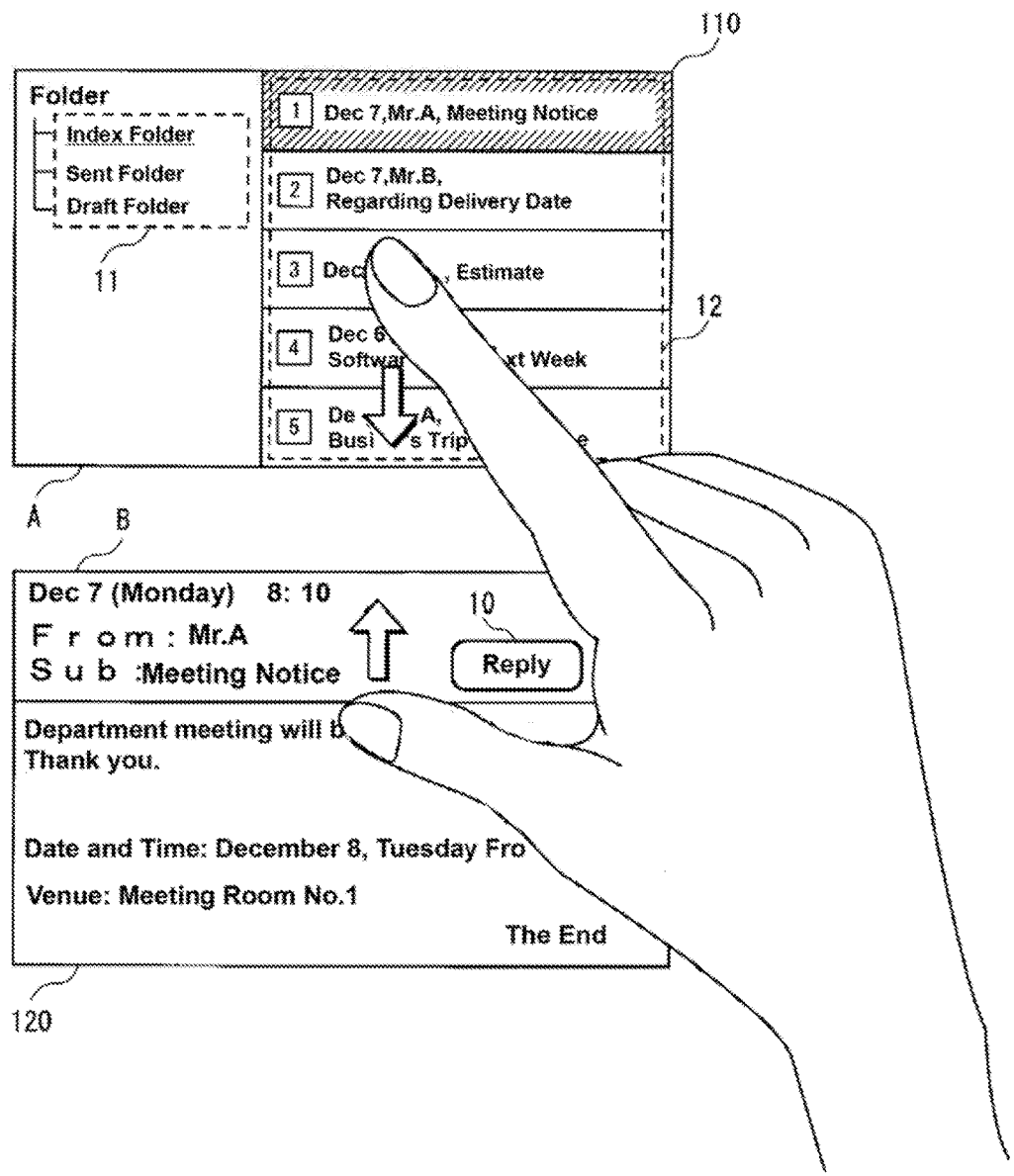
FIG. 2 is an example of images displayed on each touch panel on a cell phone.

FIG. 2 illustrates an example of images displayed on the respective touch panel on the cell phone 100, and how a user performs the interchange operation for the respective touch panel. FIG. 3 illustrates the images to be displayed on each touch panel on the cell phone 100 after the interchange operation.

FIG. 2 shows an example in which a list of folders and a list of emails in an inbox (hereinafter referred to as "email list screen") are displayed on the touch panel 110 while the details of the email located on the top of the email list (hereinafter referred to as "a email content screen") is displayed on the touch panel 120.

The email content screen comprises an icon 10 while the email list screen comprises icons 11 and 12. In this document, "an icon" is defined as a symbol that executes a computer program/process in response to receiving a touch from the user's fingers, and the like on a display thereon. In addition, the action in which a user touches an icon with his/her fingers, etc., is called selecting an icon.

When a user selects the icon 10 comprised in the email content screen, a process is executed to display a reply composition screen with respect to the received email being displayed. In addition, when the user selects the icon 11, a process is executed to display a list of emails in the folder corresponding to the position on which the user touched with his/her fingers (either one of the inbox folder, the sent folder, or the draft folder), and when the user selects the icon 12, a process is executed to display the content of the email corresponding the position on which the user touched with his/her fingers (the email content screen) onto the touch panel 110.

As described above when the cell phone 100 is in an open state, the touch panels 110 and 120 are visible; however, when the state is changed from the open state to a closed state, only the touch panel 110 becomes visible.

Therefore, if the user wants to continue looking up the email content screen displayed on the touch panel 120 after changing the cell phone 100 into the closed state, for example, by changing the cell phone 100 from the open state to the closed state after performing the interchange operation described below, the user can continue referencing the email content screen even after changing the cell phone 100 into the closed state.

FIG. 2 shows how a user manipulating the touch panel 110 in conjunction with manipulating the touch panel 120. The user touches the touch panel 110 with his/her index finger while also touching the touch panel 120 with his/her thumb. The user tries to start moving his/her index finger toward a side A of the touch panel 110 while trying to start moving his/her thumb toward a side B of the touch panel 120. The side A is a side of the touch panel 110 in the vicinity of the touch panel 120. The side B is a side of the touch panel 120 in the vicinity of the touch panel 110. Hereafter, to move the fingers, etc., while touching is also called to "drag".

In this document, the interchange operation means a series of operations in which a user drags his/her index finger touching the touch panel 110 toward the side A at a specific speed, and at the same time drags his/her thumb touching the touch panel 120 toward the side B at a specific speed, and releases his/her index finger at a position in the vicinity of the side A and his/her thumb at a position in the vicinity of the side B, respectively. The conditions including the dragging speed or the position at which fingers are released are described below with reference to FIG. 6.

Figure 3:
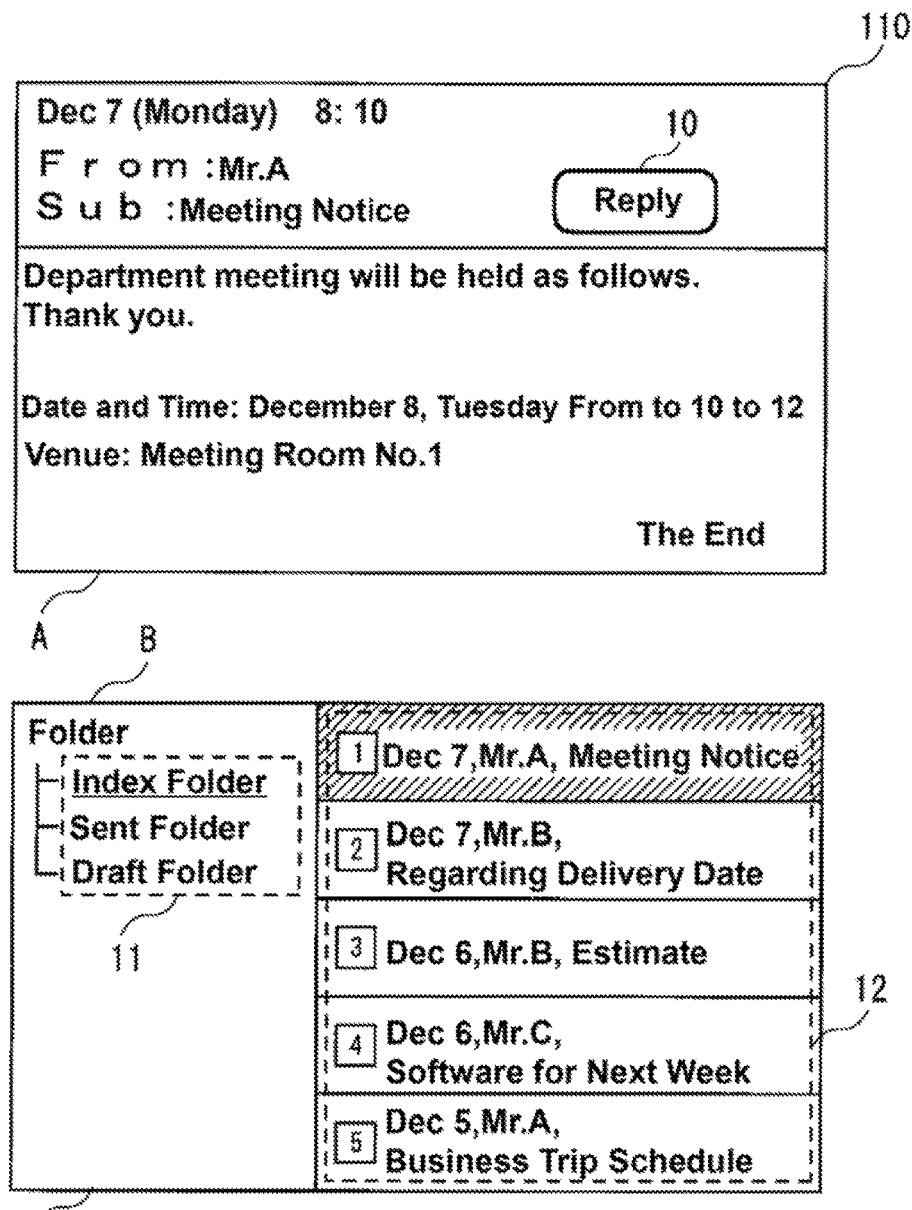
FIG. 3 is an example of images displayed on each touch panel on a cell phone after the interchange operation.

As this interchange operation is performed, as shown in FIG. 3, the cell phone 100 displays the email list screen which was displayed on the touch panel 110 before the interchange operation on the touch panel 120, and displays the email content screen which was displayed on the touch panel 120 before the interchange operation on the touch panel 110.

Hence a user can perform the interchange operation to interchange the screens displayed on the respective touch panel with each other to be displayed on the respective touch panel. Therefore, even if the state of the cell phone 100 is changed from an open state to a closed state, the user can continue looking at the email content screen in the aforementioned example.

In addition, as described above, by performing the operation as if pinching the two touch panels (interchange operation), the screens displayed on each touch panel can be interchanged with each other to be displayed on the respective touch panel, and intuitive operability is achieved.

Figure 4:
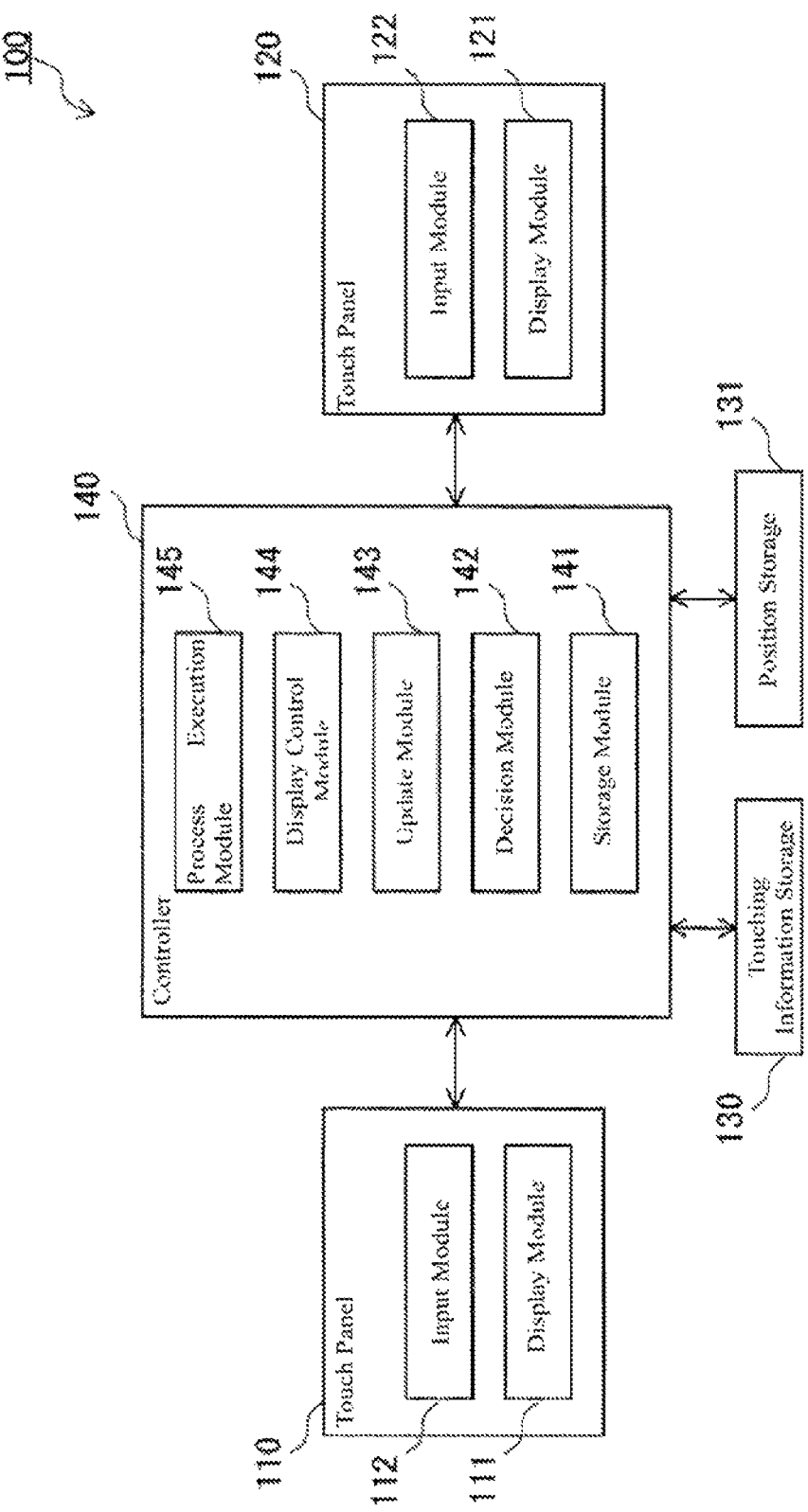
FIG. 4 is a schematic diagram illustrating the functional block diagram of a cell phone.

FIG. 4 shows a schematic diagram illustrating the functional block diagram of the cell phone 100 according to an embodiment of the disclosure. The cell phone 100 comprises the touch panels 110 and the touch panel 120, a touching information storage 130, a position storage 131, and a controller 140. The cell phone 400 may have functions, material, and structures that are similar to the embodiments shown in FIG. 1. Therefore common features, functions, and elements may not be redundantly described here.

The controller 140 comprises, a storage module 141, a decision module 142, an update module, a display control module 144, and a processor module 145 (processor execution module 145).

The touch panel 110 comprises a display module 111 and an input module 112. The touch panel 120 comprises a display module 121 and an input module 122.

Each display module comprises an LCD (Liquid Crystal Display) and is a circuit to display images such as letters and icons on the LCD instructed by the controller 140. The number of pixels (horizontal×vertical) per LCD may be 800×480 pixels.

Each input section is also a circuit that detects touching by users, and while detecting, the coordinate value (x, y) of the touched position sends to the controller 140 per unit of time (for example, 25 ms).

The coordinate value for the left upper apex of the respective touch panel is set to be (0, 0) and the coordinate value for the right lower apex is set to be (799, 479) in the following example. In addition, the respective input module is, for example, a capacitance-type touch sensor.

The touching information storage 130 is a storage area for storing the time and coordinate value when touching is started on the respective touch panel (hereinafter referred to as "touching start information") and for storing the time and coordinate value when the touching is released (hereinafter referred to as "touching end information"). The position storage 131 is a storage area for storing the coordinate value indicating the displayed position for every icon displayed on the respective touch panel. The coordinate value indicating the display position for the icon has a pair of coordinate values for the left upper corner and the right lower corner of a rectangular area containing the icon.

The coordinate value stored in the touching information storage 130, position storage 131, and/or storage module 141 comprises a coordinate value in the coordinate system for operation control described below (hereinafter referred to "logical coordinate value").

The controller 140 comprises, the storage module 141, a decision module 142, a update module 143, a display control module 144, and a processor module 145. The controller 140 is configured to support functions of the cell phone 100. For example, the controller 140 may control operations of the cell phone 100 so that a function to interchange and display screens on the respective touch panel 110/120 in response to the interchange operation by the user of the cell phone 100 is suitably performed. The controller 140 may also control operations of, for example but without limitation, the microphone 8, the touch panels 110 and 120, and the like.

Thus, the controller 140 executes various functions (applications) such as the phone call function, e-mail function, etc. Furthermore, the controller 140 controls, for example but without limitation, transmission/reception of signals, display of images by the display control module 144, and the like. In an embodiment, the controller 140 generates a display screen to be displayed on each of the touch panels 110 and the touch panel 120 within the work area provisioned in the storage module 141, and outputs an image signal for configuring the display module 111.

The controller 140, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor/controller may also be implemented as a combination of computing devices, e.g., a combination of a digital signal processor and a microprocessor, a plurality of microprocessors, one or more microprocessors in conjunction with a digital signal processor core, or any other such configuration. In practice, the controller 140 comprises processing logic that is configured to carry out the functions, techniques, and processing tasks associated with the operation of cell phone 100 such as performing control based on the detected touch to prevent reception of the detected input (non-operating state) based on a predetermined deactivating operation as explained in more detail below.

The storage module 141 is configured to associate a time and logical coordinate value when touching starts (touching start information) with the time and logical coordinate value when the touching is released (touching end information). The touching information is stored in the touching information storage 130 for each touch panel 110/120, based on the receipt of a coordinate value (hereinafter referred to as "a physical coordinate value") sent from the respective touch panel. The time (e.g., 1 ms) is obtained using a value obtained as needed from a clock module (not shown). The storage module 141 stores the touching start information when touching starts on the respective touch panel 110/120 and the touching end information when the touching is released individually into the touching information storage module 130.

Figure 5:
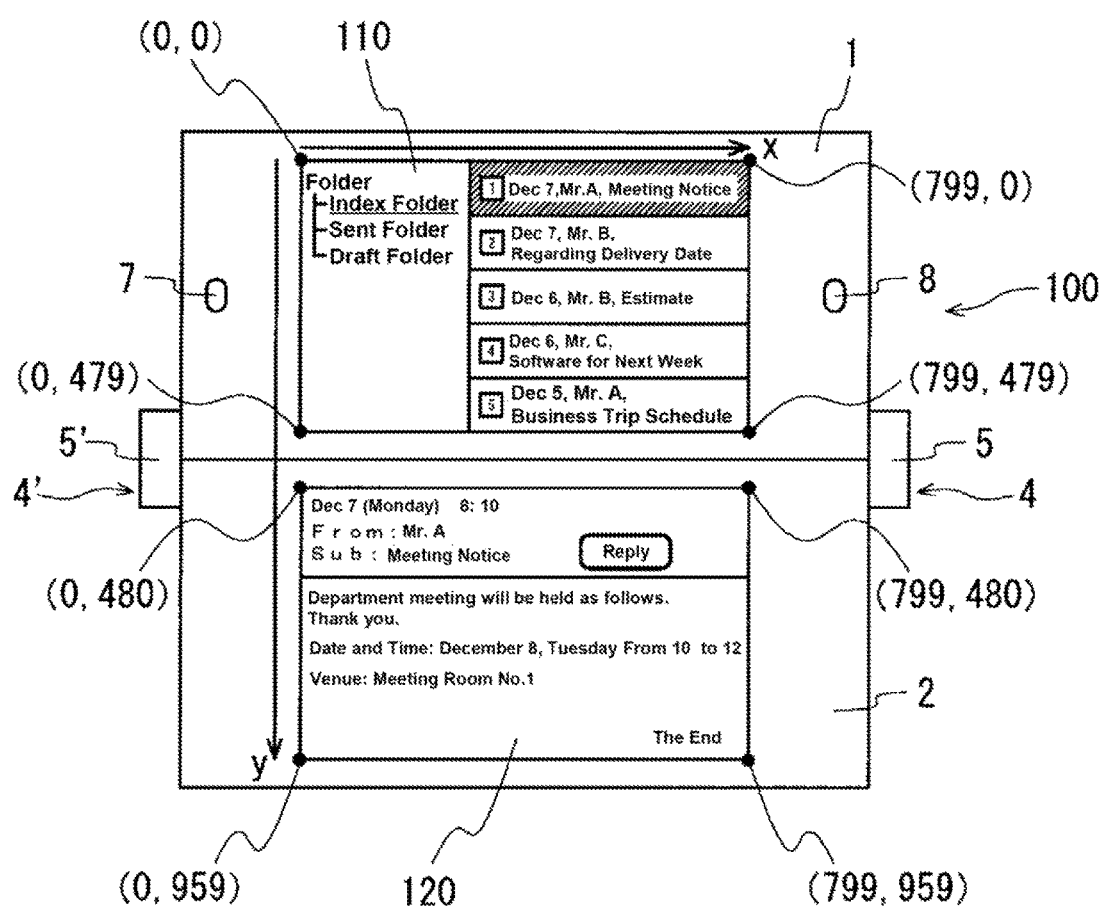
FIG. 5 is an illustration of a coordinate system for operation control.

FIG. 5 is an illustration of a coordinate system for operation control according to an embodiment of the disclosure, the coordinate system for operation control comprises a coordinate system defining the left upper corner of the touch panel 110 as a coordinate value of (0, 0), wherein the x axis is provided in the right direction and the y axis in the down direction as shown in FIG. 5.

FIG. 5 shows an example of coordinate values in the coordinate system for operation control in which the touch panel 110 has the coordinate value (799, 0) for the right upper corner, the coordinate value (0, 479) for the left lower corner, and the coordinate value (799, 479) for the right lower corner, while the touch panel 120 has the coordinate value (0, 480) for the left upper corner, the coordinate value (799, 480) for the right upper corner, the coordinate value (0, 959) for the left lower corner and the coordinate value (799, 959) for the right lower corner.

Therefore, since physical coordinate values received from the touch panel 110 are matched with logic coordinate values in the coordinate system for operation control, the storage module 141 uses the physical coordinate values received from the touch panel 110 as the logical coordinate values in the coordinate system for operation control without any change. On the other hand, if physical coordinate values are received from the touch panel 120, the storage module 141 adds "480" to the y coordinates of the received physical coordinate values to use as logical coordinate values in the coordinate system for operation control.

Moreover, the controller 140 associates the logical coordinate values ranging from (0, 0) to (799, 479) with the touch panel 110 and associates the logical coordinate values ranging from (0, 480) to (799, 959) with the touch panel 120 to manage those.

The decision module 142 is configured to decide whether the operation performed on the respective touch panel 110/120 is either the screen interchange operation, the screen scrolling operation, or the icon selection operation based on the touching start information and touching end information for each touch panel stored in the touching information storage 130. Specific decision conditions are described below in the context of discussion of FIG. 6 below.

Moreover, the decision module 142 manages the state information. For example, the decision module 142 uses "0" for the state in which the interchange is not performed, "1" for the state in which the interchange is performed, and the default value when the cell phone 100 is started etc., shall be set to "0". In this manner, the decision module 142 indicates whether or not the screen is interchanged on the above-mentioned storage, updates to "1" when the state information is "0", and updates to "0" if the state information is "1", whenever the operation performed on the respective touch panel 110/120 is decided as the screen interchange operation. This state information is communicated to each module within the controller 140 such that each modules determines whether or not it is in the state in which the screen interchange is performed by referencing to the state information.

The update module 143 is configured to update the logical coordinate values indicating the displayed position for each icon (the coordinate value for the left upper corner and the coordinate value for the right lower corner) to the logical coordinate values after the interchange.

In other words, the logical coordinate values for an icon displayed on the touch panel 110 are updated by adding "480" to the y coordinates, while the logical coordinate values for an icon displayed on the touch panel 120 is updated by subtracting "480" from the y coordinates.

The display control module 144 is configured to display on the display modules (111 and 121) of the respective touch panel 110 and 120 the screen according to the decision result from the decision module 142, and a screen according to the process result from the process execution module.

The display control module 144 manages a memory association between the two areas, namely m1 and m2, in the aforementioned storage that stores image data other than the icons constituting the screens on the respective touch panel (hereinafter referred to as "drawing data") and the respective touch panels 110 and 120.

The memory association is updated when the interchange operation is performed to provide an updated memory association. In other words, if the area m1 is associated with the touch panel 110 and the area m2 is associated with the touch panel 120, for example, when the screen interchange operation is performed, the memory association is updated to associate the area m1 with the touch panel 120 and to associate the area m2 with the touch panel 110.

The display control module 144 displays the drawing data stored in the storage area that is associated with the touch panel 110 on the touch panel 110 based on the updated memory association, when the interchange operation is performed. The display control module 144 also displays icons whose coordinate values are included in a range of logical coordinate values (e.g., a rectangle from point (0, 0) to point (799, 479)) that are associated with the touch panel 110 on the touch panel 110, when the interchange operation is performed. The icons are displayed based on the logical coordinate values for each icon updated by the update module 143.

In addition, the display control module 144 displays the drawing data stored in the storage area that is associated with the touch panel 120, and icons whose coordinate values are included in the range, (0, 480) to (799, 959), of logical coordinate values that are associated with the touch panel 120 onto the touch panel 120.

In this manner, the display control module 144 can display the drawing data and icons that are displayed on the touch panel 110 before the interchange operation on the touch panel 120. In addition, the display control module 144 can display the drawing data and icons that were displayed on the touch panel 120 before the interchange operation on the touch panel 110.

Moreover, the display control module 144 is also configures to register logical coordinate values indicating displayed positions of icons contained in the screen according to the process result from the process execution module 145 into the position storage 131.

The process execution module 145 is configured to execute a process assigned to an icon when the icon is selected.

Figure 6:
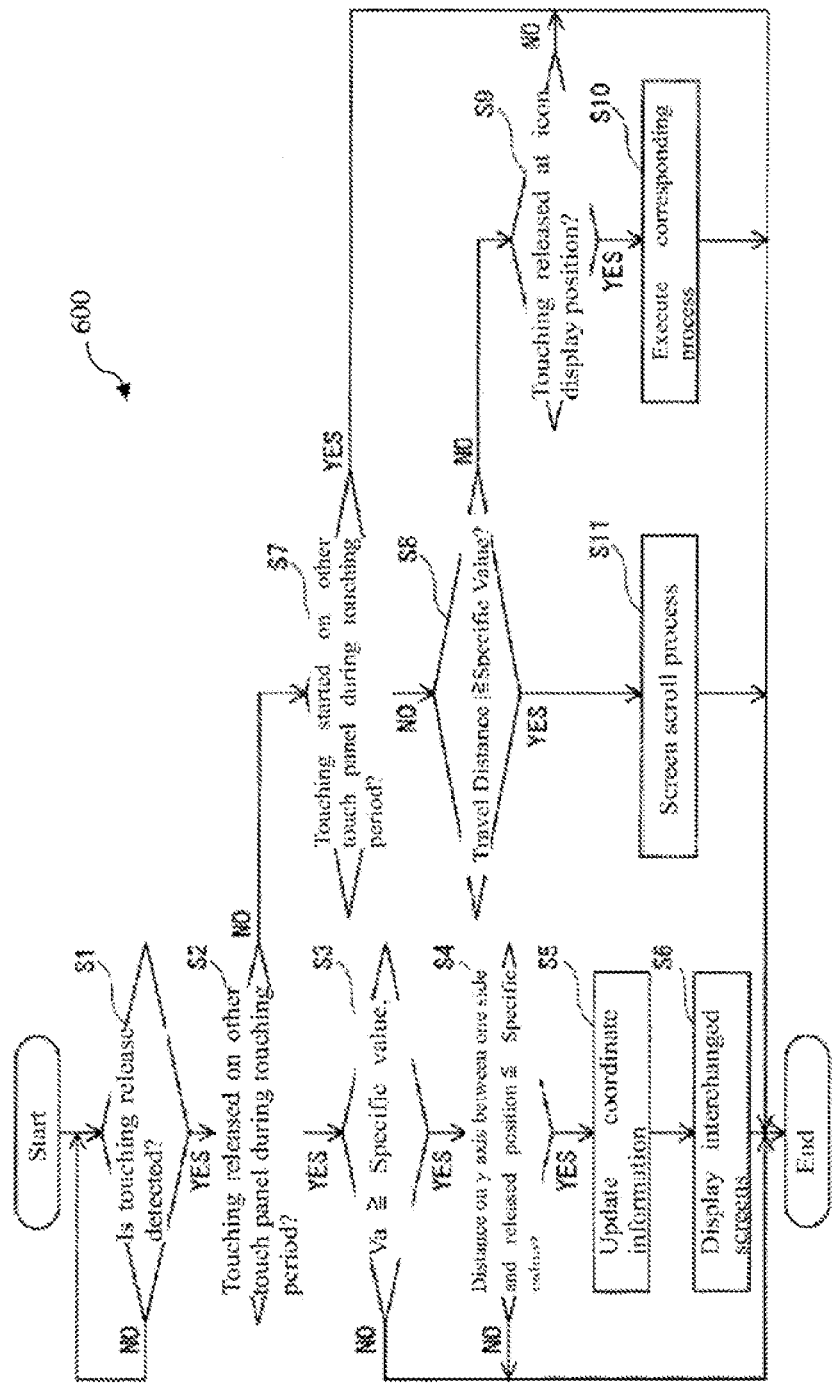
FIG. 6 is a flow chart illustrating the control process of a cell phone.

FIG. 6 is an illustration of an exemplary flowchart showing a process 600 of the cell phone 100 an 300 for input via each touch panel according to an embodiment of the disclosure. The various tasks performed in connection with the process 600 may be performed by software, hardware, firmware, a computer-readable medium having computer executable instructions for performing the process method, or any combination thereof. The process 600 may be recorded in a computer-readable medium such as a semiconductor memory, a magnetic disk, an optical disk, and the like, and can be accessed and executed, for example, by a CPU such as the controller 140 in which the computer-readable medium is stored.

It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. For illustrative purposes, the following description of process 600 may refer to elements mentioned above in connection with FIGS. 1-5. In practical embodiments, portions of process 600 may be performed by different elements of the cell phone 100 and 400, for example, the controller 140, a touch panel 110, the touch panel 120, the touching information storage module 130, the position storage module 131 etc. The process 600 may have functions, material, and structures that are similar to the embodiments shown in FIGS. 1-4. Therefore common features, functions, and elements may not be redundantly described here.

As a process independent of the control process shown in the figure, a storage part 141 of the controller 140 stores the touching start information when touching is started on the respective panel and the touching end information when the touching is released individually into the touching information storage 130. In addition, the control process shown in the figure should be executed repeatedly.

The decision module 142 decides whether or not touching with fingers, etc., is released on either one of the touch panels 110/120, based on whether or not the touching end information is stored in the touching information storage 130 by the storage module 141 (Inquiry task S1), and when the storage module 141 does not store the touching end information (NO branch of inquiry task S1), the process in the inquiry task S1 is executed again.

However, if the storage module 141 has stored the touching end information (Yes branch of inquiry task S1), the decision module 142 decides whether or not touching with fingers, etc., on the touch panel 120 is released during the period in which the touch panel 110 is being touched with fingers, etc., based on the information stored in the touching information storage 130 (inquiry task S2).

More specifically, the decision module 142 provides positive decision, for example, assuming that the touch panel related to the detection in the inquiry task S1 is the touch panel 110, when the time in the touching end information for the touch panel 120 is included within the period from the time in the touching start information to the time in the touching end information for the touch panel 110 (YES branch of inquiry task S2). Moreover, when the touching end information for the other touch panel 120 is not stored in the touching information storage 130, decision module 142 would provide negative decision (NO branch of inquiry task S2).

During the period when one of the touch panel 110/120 is being touched with fingers, etc., when the decision module 142 decides that touching with fingers, etc., is released on other touch panel 110/120 (YES branch of inquiry task S2, based on each information stored in the touching information storage 130, the decision module 142 decides whether the drag speed va is equal to or more than a specific value v1 (a positive value) for the direction perpendicular to the side A of the touch panel, and decides whether the drag speed vb is equal to or more than a specific value v2 (a negative value) for the direction perpendicular to the side B of the touch panel 120 (inquiry task S3).

The drag speed in the respective touch panel 110/120 is a value which is obtained by subtracting the y coordinate value in the start end information from the y coordinate value in the touching end information divided by the value which is obtained by subtracting the time in the touching start information from the time in the touching end information. The description below assumes that v1 is "2" and that v2 is "−2" as one example.

If the drag speed va on the touch panel 110 is equal to or more than a specific value v1 and the drag speed vb on the touch panel 120 is equal to or more than a specific value v2 (YES branch of inquiry task S3), the decision module 142 decides whether or not both the distance on the y axis between the position at which touching with fingers, etc., is released on the touch panel 110 and the side A, and the distance on the y axis between the side B and the position at which touching with fingers, etc., is released on the touch panel 120 are equal to or less than a specific value (e.g., 50), based on the touching end information for the respective touch panel stored in the touching information storage 130 (inquiry task S4).

If the distance on the y axis between the position at which touching with fingers, etc., is released on the touch panel 110 and the side A, and the distance on the y axis between the side B and the position at which touching with fingers, etc., is released on the touch panel 120 are equal to or less than the specific value (YES branch of inquiry task S4), the decision module 142 decides that the operation performed in the respective touch panel is the interchange operation and updates the state information, while the update module 143 of the controller 140 updates the logical coordinate values indicating the displayed position for each icon stored in the position storage 131 to the logical coordinate values after the screen interchange (task S5). In other words, the update module 143 updates y coordinate values by adding "480" to the y coordinates when the y coordinate values are within the range from 0 to 479 for each logical coordinate value stored in the position storage 131 and updates y coordinate values by subtracting "480" from the y coordinate values when the y coordinate values are within the range from 480 to 959.

In addition, the display control module 144 of the controller 140 interchanges the screen displayed on the display module 111 of the touch panel 110 and the screen displayed on the display module 121 of the touch panel 120 with each other and displays on each display module (task S6). In other words, the display control module 144 updates the association between the area in which each drawing datum is stored and each touch panel 110/120, and then displays the drawing data based on the association after the update and the icons based on the coordinate values stored in the position storage 131 after the update on the display module 111/121 of each touch panel 110/120 respectively.

When the screen interchange process is completed in the task S6, the controller 140 deletes the touching start information and the touching end information for each touch panel stored in the touching information storage 130 to end the control process.

In addition, in the inquiry task S3, when the drag speed va on the touch panel 110 is less than the specific value v1 or when the drag speed vb on the touch panel 120 is more than the specific value v2 (NO branch of inquiry task S3), and in the NO branch of inquiry task S4, when at least one of the distance on the y axis between the position at which touching with fingers, etc., is released on the touch panel 110 and the side A, or the distance on the y axis between the side B and the position at which touching with fingers, etc., is released on the touch panel 120 is more than the specific value (NO branch of inquiry task S3), the controller 140 ends the control process without interchanging the screens. This is because if the decision conditions are not met in the inquiry tasks S3 and S4, the operation performed by the user is considered to be the one not intended to interchange the screens.

On the other hand, in the inquiry task S2, when the decision module 142 decides within the period during which one of the touch panel 110/120 is being touched with fingers. etc., that touching with fingers, etc., is not released on other one of touch panel 110/120 (NO branch of inquiry task S2), the decision module 142 decides, during the period during which one of the touch panel 110/120 is being touched with fingers etc., whether touching the other one of the touch panel 110/120 with fingers etc. is started or not (inquiry task S7).

More specifically, the decision module 142 provides positive decision, when the time in the touching start information of other touch panel is included between the time in the touching start information and the time in the touching end information for the touch panel that detects that touching is released in inquiry task S1. Moreover, when the touching start information for other touch panel is not stored in the touching information storage 130, the decision module 142 provides negative decision (NO branch of inquiry task S7).

When decision module 142 decides that within the period during which one touch panel is being touched with fingers, etc., touching other touch panel with fingers is started (YES branch of inquiry task S7), the controller 140 ends the process. This is because the process 600 starts again from the inquiry task S1 to perform the screen interchange process when touching the other touch panel with fingers, etc., is released.

In addition, since it can be decided that the operation is performed on only one touch panel when it is decided that within the period during which one touch panel is being touched with fingers, etc., touching other touch panel with fingers, etc., is not started (NO branch of inquiry task S7), the decision module 142 decides whether the absolute value of the travel distance in the x axis direction or the absolute value of the travel distance in the y axis direction on the touch panel that detected touching is released in task S1 is equal to or more than the specific value or not (inquiry task S8).

More specifically, process 600 calculates a travel distance (x2−x1, y2−y1) using the coordinate value (x2, y2) in the touching end information and the coordinate value (x1, y1) in the touching start information that are stored in the touching information storage 130 for the touch panel that detected touching is released in inquiry task S1, and when the absolute value of travel distance in the x axis direction (|x2−x1|) or the absolute value of travel distance in the y axis (|y2−y1|) is equal to or more than a specific value (for example "10"), it provides positive decision (YES branch of the inquiry task S8).

When the absolute value of travel distance in the x axis direction or the absolute value of travel distance in the y axis direction on the touch panel that detected that touching is released in the inquiry task S1 is equal to or more than a specific value (YES branch of inquiry task S8), the display control module 144 displays the screen displayed on the display section of the touch panel by scrolling along the axis whose travel distance absolute value is equal to or more than the specific value, depending on the travel distance in the axis direction (task S11).

The controller 140 deletes the touching start information and the touching end information, which is stored in the touching information storage 130, for the touch panel that detects touching is release in the inquiry task S1 and ends the control process.

In the inquiry task S8, when the absolute value of travel distance in the x axis direction and the absolute value of travel distance in the y axis on the touch panel that detected touching is released in the inquiry task S1 are less than the specific values (NO branch of inquiry task S8), based on the logical coordinate values (the coordinate value for left upper corner and the coordinate value for right upper corner) for each icon stored in the position storage 131, the decision module 142 decides whether or not the coordinate values of the position at which touching is released (the coordinate values in the touching end information) are to be included in the displayed position of the icon (inquiry task S9).

When the coordinate values of the position at which touching is released are not included in the display position of the icon (NO branch of inquiry task S9), it deletes the touching start information and the touching end information, which is stored in the touching information storage 130, for the touch panel that detects that touching is released in inquiry task S1 and ends the control process.

In addition, when the coordinate values of the position at which touching is released are included in the display position of the icon (YES branch of inquiry task S9), the process execution module 145 executes the process assigned to the icon (task S10), and deletes the touching start information and the touching end information, which is stored in the touching information storage 130, for the touch panel that detected touching is released in inquiry task S1 and ends the control process.

(1) In an embodiment as described above, when an interchange operation is performed by a user, an image displayed on the display module 111 of the touch panel 110 and an image displayed on the display module 121 of the touch panel 120 are interchanged with each other to be displayed on each display module as they are; however, some of the image displayed may be enlarged to be displayed. Hereinafter, the cell phone according to this modification is referred to as "a modified cell phone".

Figure 7:
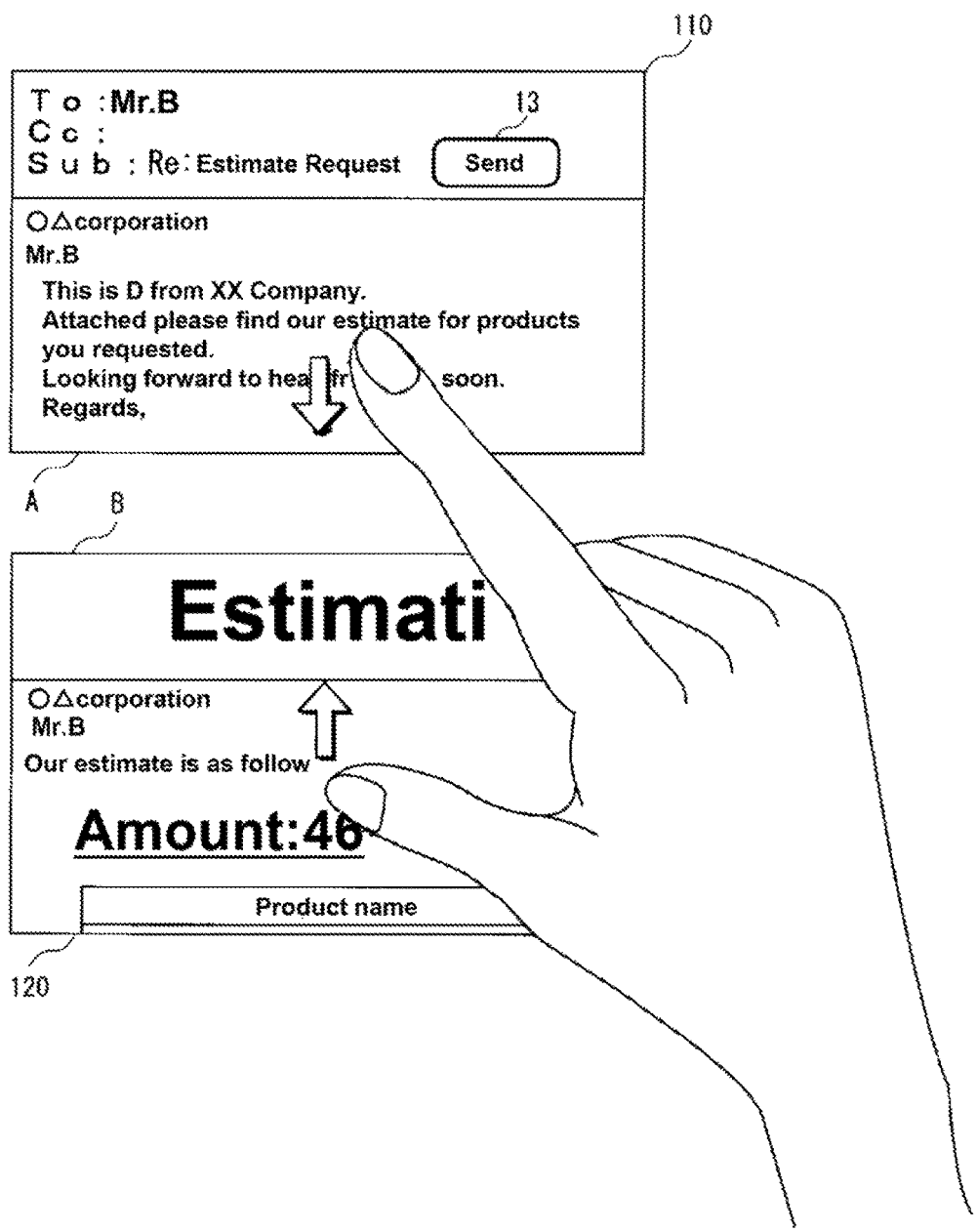
FIG. 7 is an example of images displayed on each touch panel of a cell phone.

FIG. 7 shows an example of images displayed on the respective touch panels 110/120 of the cell phone 100 and how the user performs the interchange operation for each touch panel, while FIG. 8 shows the screens to be displayed on the respective touch panels of the modified cell phone after the interchange operation.

FIG. 7 shows an example in which the content of email in the process of composition (hereinafter referred to as "email composition screen") is displayed on the touch panel 110, and a document to be attached to the email in the process of composition (hereinafter referred to as "estimation screen") is displayed on the touch panel 120.

Moreover, the email composition screen contains the icon 13 which executes a process to send an email when the user selects the icon 13.

When the user performs the interchange operation, as shown in FIG. 8, the cell phone 100 displays the email composition screen onto the touch panel 120 and displays an enlarged screen at a predetermined magnification (for example, two-fold) of some of the estimation screen displayed on the touch panel 120 before the interchange operation onto the touch panel 110. Here, an example in which, when performing the interchange operation, the estimation screen enlarged around the position at which the user starts touching with his/her thumb on the touch panel 120 is displayed on the touch panel 110 is shown.

Moreover, this example is described such that the screen (the estimation screen) displayed on only the touch panel 120 is enlarged and displayed on the touch panel 110; however, the screen displayed on the touch panel 110 may be similarly enlarged and displayed, or, for example, types of applications may be specified regarding screens to be enlarged, and only when screens displayed when the interchange operation is performed are the screens related to the specified applications, they may be enlarged.

In addition, this example is described such that the screen displayed is automatically enlarged and displayed as the interchange operation is performed; however, it may be enlarged only when the drag speed on the respective touch panels or the drag distance (the distance between the position at which touching with fingers, etc., is started and the position at which the touching is released) is equal to or more than a threshold.

In addition, this example is described such that the screen displayed is enlarged at a predetermined magnification; however, it may be enlarged according to the drag distance or the drag speed.

Moreover, the estimation screen displayed on the touch panel 120 in FIG. 7 is illustrated without any icon; however, if there is any icon, when the interchange operation is performed, the logical coordinate values for the icon must be updated.

An exemplary update process is described below.

As described above assuming the coordinate value for the left upper corner is (xl, yl) and the coordinate value for the right lower corner is (xr, yr) after subtracting "480" from the coordinate value for the left upper corner and the coordinate value for the right lower corner of an icon which are stored in the position storage 131, first, the coordinate value for the central point (xc, yc)=((xr+xl)/2, (yr+yl)/2) shall be calculated.

Subsequently, the coordinate value for the left upper corner and the coordinate value for the right lower corner are updated to enlarge the distance from the central point to the left upper corner as well as to the right lower corner by the predefined magnification of Z.

In other words, the coordinate value for the left upper corner is updated to (xc−Z×(xc−xl), yc−Z×(yc−yl)) and the coordinate value for the right lower corner is updated to (xc+Z×(xr−xc), yc+Z×(yr−yc)).

(2) Although the cell phone 100 according to the embodiment is described as a sliding-type cell phone, it may be a cell phone comprising other appearance such as a folding-type cell phone, etc.

For example, the cell phone 100 may be a folding-type cell phone 200 shown in FIG. 9 (a) to (c).

The cell phone 200 is configured such that the first housing 201 comprising the touch panel 210 and the second housing 202 comprising the touch panel 220 can be opened and/or closed with each other.

As shown in FIG. 9 (a), the cell phone 200, by closing the first housing 201 and the second housing with each other after the first housing 201 is rotated 180 degree with respect to the second housing as shown in FIGS. 9 (b) and (c), from the state in which the first housing 201 and the second housing 202 are opened with each other and in which the respective touch panel is visible, the touch panel 220 that the second housing 202 comprises is hidden behind the first housing 201, and only the touch panel 210 that the first housing 201 comprises becomes visible.

After a user performs the interchange operation for the respective touch panel in the state shown in FIG. 9 (a), by changing the state of the cell phone 200 as shown in FIGS. 9 (b) and (c), even when the cell phone 200 is in a closed state as shown in FIG. 9 (c), the user can display the screen displayed on the touch panel 220 before the interchange operation onto the touch panel 210 to look at the screen which was displayed on the touch panel 220.

In addition, this modification and the embodiment are described using a cell phone enabling change in the state through closing and/or opening as an example; however, these modifications may be applied to a cell phone without any state change through opening/closing, such as a straight type. These modifications may be applied to the modified cell phone.

(3) Although the input module for each touch panel according to the embodiment is described such that it is provided with a capacitance-type touch sensor, for this capacitance-type touch sensor, a proper type may be used such as a projection type in which many electrode patterns are formed on a board made from such as plastic, or glass, etc., and in which the electric current ratio by a plurality of electrode patterns in the vicinity of a touching point is measured for decision, or a surface type comprising a conductive layer and a board in which electrodes are installed at corners of the board, and in which an even electric field is formed by the conductive layer, and in which the electric current ratio by the corner terminals due to touching with fingers, etc., is measured to decide a touching point, etc.

In addition, the input module on each touch panel 110/120 is not limited to using the capacitance-type touch sensor, and the input module may use, for example but without limitation, an electromagnetic induction type using a specific pen such as an electric pen, a matrix switch type comprising double-layered structure of transparent electrodes, a resistance film type in which applying voltage to one of two resistance films to detect the voltage corresponding to the position of operation on other resistance film, a surface elastic wave type which detects rebound of elastic wave as voltage change in piezo elements to detect touching of fingers, an infrared type which detects the position at which it is being touched with fingers, by shielded infrared, a light sensor type which detects the touching position by incorporating light sensors on screens, and the like.

These modifications may be applied to the cell phone 100 or to the cell phone 200.

(4) Although the cell phone 100 according to the embodiment is described such that the touch panel 110 and the touch panel 120 are arranged one above the other on approximately the same plane from the user point of view in a normal use state, they may be arranged side by side. When the touch panel 110 is arranged on the left side and the touch panel 120 on the right side, the coordinate values in the coordinate system for operation control for the touch panel 110 are not changed while the coordinate values in the coordinate system for operation control for the touch panel 120 are changed as follows.

In other words, for the touch panel 120, the coordinate value for the left upper corner turns (800, 0), the coordinate value for the right upper corner turns (1599, 0), the coordinate value for the left lower corner turns (800, 479), and the coordinate value for the right lower corner turns (1599, 479).

Therefore, when the interchange operation is performed, the logical coordinate value for an icon displayed on the touch panel 110 is updated by adding "800" to the x coordinate value while the logical coordinate value for an icon displayed on the touch panel 120 is updated by subtracting "800" from the x coordinate value.

This modification may be applied to the cell phone 100 or the cell phone 200.

(5) Although the cell phone 100 according to the embodiment is described such that the touch panel 110 and the touch panel 120 are arranged on approximately the same plane in the open state as shown in FIG. 1(c), it may be arranged in any mode as long as the user can operate to meet the conditions for the interchange operation.

For example, in an open state, the cell phone 100 may be arranged such that the surface containing the touch panel 110 on the first housing 1 and the surface containing the touch panel 120 on the second housing 2 are nearly parallel, or it may be arranged such that an angle sufficient for fingers, etc., to touch on the surfaces of the touch panels is created between the surface containing the touch panel 110 on the first housing 1 and the surface containing the touch panel 120 on the second housing 2.

In addition, although in the above embodiments the number of pixels in LCD on the respective touch panel is same and the shape of LCD is nearly rectangular, the number of pixels for each LCD may be different and the shape of each LCD may be, for example but without limitation, circular, other polygon, and the like, as long as each LCD is in the mode in which a user can operate to meet the conditions for the interchange operation.

This modification may be applied to the cell phone 100 or the cell phone 200.

(6) With reference to FIG. 6, it is described such that in order to reduce the possibility that the screens are interchanged when the user performed an operation similar to the interchange operation by mistake, when the decision conditions in the inquiry tasks S3 and S4 are met, then the processes in the tasks S5 and S6 are executed; however, the decision in the inquiry task S3 and S4 may be not be used, and when the decision conditions in the inquiry task S2 are met, the tasks S5 and S6 may be executed.

In addition, in the inquiry task S3, although it is described such that the specific value V1 which is compared with the drag speed va in a direction perpendicular to the side A on the touch panel 110 shall be "2" while the specific value V2 which is compared with the drag speed in a direction perpendicular to the side B on the touch panel 120 shall be "−2", this is one example, and V1 and V2 may be any other values.

In addition, in the inquiry task S4, it is described such that both the specific value which is compared with the distance on the y axis between the position at which touching with fingers, etc., is released on the touch panel 110 and the side A, and the specific value which is compared with the distance on the y axis between the side B and the position at which touching with fingers, etc., is released on the touch panel 120 shall be "50", however, this is one example, and these may be any other values, or the specific value which is compared with the distance on the y axis between the position where touching with fingers, etc., is released on the touch panel 110 and the side A may be different from the specific value which is compared with the distance on the y axis between the side B and the position at which touching with fingers, etc., is released on the touch panel 120.

Moreover, at the time of starting using the cell phone 100 according to the embodiment, the specific values used in the inquiry tasks S3 and 4 may be decided based on the result after the user performed the interchange operations several times, or the user may be allowed to set up any values.

Further, when the decision conditions in the inquiry task S2 are met, in place of the inquiry tasks S3 and 4, it may perform to decide whether or not the touching position on the touch panel 110 is changed to a specific direction towards the touch panel 120 (for example, the direction perpendicular to the side A), and whether or not the touching position on the touch panel 120 is changed to a specific direction towards the touch panel 110 (for example, the direction perpendicular to the side B), and then to execute the processes in the task S5 and S6 when this decision condition is met. In other words, the screen interchange may be performed when the touching position change to a specific direction toward each other's touch panel on each touch panel occurs simultaneously.

In addition, if the decision conditions in the inquiry task S2 are met, in place of the inquiry tasks S3 and 4, it may perform to decide whether or not the touching position on the touch panel 110 is, regarding the vector in the direction perpendicular to one side (for example the side A) in the vicinity of the touch panel 120, changed to the direction toward such one side for a specific amount or more, and regarding the vector in the direction perpendicular to one side (for example, the side B) in the vicinity of the touch panel 110, the touching position on the touch panel 120 is changed to the direction toward such one side for a specific amount or more or not, and to execute processes in the task S5 and S6 when this decision condition is met. In other words, the screen interchange may be performed when the touching position on each touch panel is changed to the direction towards such one side for a specific amount or more regarding the vector in the direction perpendicular to one side close to each other's touch panel. This modification may be applied to the cell phone 100 or the cell phone 200.

(7) Although the above embodiments are described using an example in which the controller 140 manages and processes the coordinate values on the touch panels 110 and 120 as logical coordinate values in one coordinate system for operation control, the controller 140 may manage and process using coordinate values in individual xy coordinate system for every touch panel, i.e. the physical coordinate values themselves. In this case, additional information specifying the touch panel for every icon to be displayed must be stored in the position storage 131, and when the interchange operation is performed, the update module 143 shall update this information to specify other touch panel. This modification may be applied to the cell phone 100 or the cell phone 200.

(8) Among each component described in the embodiments herein, all or some may be provided in one chip or multiple-chip integrated circuits, or may be provided in computer programs, or may be provided in any other fashion. These may be similarly applied to the cell phone 200.

(9) The programs to instruct CPUs to execute the process for input from the respective touch panel described in the embodiment (with reference to FIG. 6) may be recorded on record media or distributed and delivered via various types of communication paths, etc. Such record media include IC cards, optical discs, flexible discs, RCMs, and flash memory, etc. The distributed and delivered programs may be used by storing in memory, etc., that can be read by CPUs in devices, and the programs are executed by the CPUs to provide each function of the cell phone 100/200/400. These may be similarly applied to the cell phone 200.

(10) The embodiments comprise a first and a second touch panels 110/120 for displaying images, respectively; the decision module 142 when touching is detected on both of the first and the second touch panels 110/120, decides whether or not specific conditions are met, including one in which a touching position on the respective touch panel is changed to a predefined direction toward the other touch panel, respectively, as a requirement; and a display control module, when the decision module decides that the specific conditions are met, displays at least some of the image displayed on the other touch panel.

In an embodiment, when an operation meeting the specific conditions are performed on each panel, at least some of the image displayed on the other touch panel can be displayed on the respective touch panel; hence, regarding the image displayed on one panel, the benefit which is provided when it is displayed on other touch panel can be realized.

For example, when the performance on the first touch panel is higher than the performance on the second touch panel, the image being displayed on the second touch panel can be displayed on the first touch panel with higher performance by performing the operation described above.

In addition, for example, when the mobile phone can be arranged such that one touch panel is hidden, it becomes possible to display the image that the user wants to continue looking at on the other touch panel which is not hidden by performing the operation described above in advance to interchange the image being displayed on the respective touch panels with each other to be displayed on the respective touch panel, when this mobile device is arranged as described above.

(11) In addition, the respective touch panels may comprise a display area which is approximately rectangular and the specific direction may be the direction toward one side in the vicinity of the other touch panel when the device is in the mode in which both of the first and the second touch panels are arranged side by side on approximately the same plane.

In this manner, in an the mobile phone 100/200 can provide intuitive operability since at least some of the image displayed on other touch panel, respectively is displayed onto each touch panel when the operation meeting the specific conditions including one in which the touching position on each touch panel is changed to the direction toward one side in the vicinity of the other touch panel, respectively, as a requirement.

(12) In addition, the display control module may display the entire image displayed on the other touch panel before such decision, in place of the image displayed on the respective touch panel, when the decision module decides that the specific conditions are met.

In this manner, according to the embodiment of the disclosure, for example, when the mobile phone can be arranged such that the second touch panel is hidden and only the first touch panel is visible, by performing the operation meeting the specific conditions in advance, the image displayed on the second touch panel which is what the user wants to continue looking at can be displayed onto the first touch panel; hence, the user can look at any images he/she wishes even if the device is arranged in the aforementioned mode later.

(13) In addition, the specific conditions may include one in which the touching position on the respective touch panel is, regarding the vector in the direction perpendicular to one side in the vicinity of the other touch panel, respectively, changed to the direction toward such one side for a specific amount or more per unit of time, as a requirement.

In this manner, in an embodiment, at least some of the image displayed on the respective touch panels is not interchanged, when the change in the vector in the specific direction of the touching position on each touch panel per unit of time is less than the specific amount. Therefore, when the user performs an operation such as the touch position on the respective touch panel is changed to a specific direction toward the other touch panel respectively by mistake, the possibility that at least some of the image displayed on the respective touch panels is interchanged and displayed can be reduced.

(14) In addition, the specific touch conditions may include one in which the distance between each position at which touching on each panel is released and the side in the vicinity of the other touch panel falls within a specific value, as a requirement.

In this manner, in an embodiment, when the distance between each position at which touching on the respective touch panel is released and one side in the vicinity of the other touch panel is more than a specific value, at least some of the image displayed on the respective touch panel is not interchanged. Therefore, when the user performs an operation such as the touch position on each touch panel is changed to a specific direction toward the other touch panel respectively by mistake, the possibility that at least some of the image displayed on the respective touch panels is interchanged and displayed can be reduced.

(15) In addition, the mobile phone 100/200 may further store, for each icon, the position identification information for identifying the icon displayed position on the first or the second touch panel. The process execution module 145 executes the process assigned to such icon when touch is detected on only one of the touch panels 110/120 and when touch is released on the displayed position for the icon identified by the position specifying information. The update module 143 updates the position identification information such that the respective icon displayed position indicates a position on a touch panel 110/120 that is different after such decision from before, if the decision module 142 decides that the specific touch conditions are met. The display control module 144 may cause the respective touch panel 110/120 to perform the display based on the position identification information updated by the update module 143 when the decision module 142 decides that the specific conditions are met.

In this manner, in an embodiment, since when the operation meeting the specific touch conditions are performed on the respective touch panels 110/120, the position identification information is updated such that the display position for each icon indicates the position on the other touch panel, after the images displayed on each touch panel are interchanged, even when the user releases touching with his/her fingers, etc., at the position at which the icon is displayed, the process assigned to the icon can be executed in the same way as before the images are interchanged.

(16) In addition, the display control module 144 may display an enlarged image from at least some of the image displayed on a second touch panel onto the first touch panel, in place of the image displayed on the first touch panel, when the decision module 142 decides that the specific touch conditions are met.

In this manner, since the mobile phone 100 displays an enlarged image from at least some of the image displayed on the second touch panel onto the first touch panel when the operation meeting the specific touch conditions is performed on the respective touch panel, the visibility can be enhanced for images that are small and difficult to look at.

(17) In addition, the specific touch conditions may include one in which a period during which the change in the touch position in a specific direction toward other touch panels respectively on the respective touch panel occurs simultaneously is present, as a requirement.

In this manner, according to an embodiment, at least some of the images displayed on each touch panel are not interchanged when there is no period during which the changes in the touch position on the respective touch panel in a specific direction toward each other's touch panel occur simultaneously. Therefore, when the user performs an operation such as the touch position on each touch panel is changed to a specific direction toward the other touch panel by mistake, the possibility that at least some of the image displayed on the respective touch panel are interchanged and displayed can be reduced.

(18) In addition, the specific touch condition may include one in which, regarding the vector in the direction approximately perpendicular to one side in the vicinity of the other touch panel respectively, the touch position on the respective touch panel is changed to the direction toward the one side for a specific amount or more, as a requirement.

In this manner, in an embodiment, at least some of the images displayed on each touch panel are not interchanged when the touch position on the respective touch panel is, regarding the vector in the direction perpendicular to one side in the vicinity of the other touch panel respectively, not changed to the direction toward such one side for a specific value or more. Therefore, when the user performs an operation such as the touch position on the respective touch panel is changed to a specific direction toward the other touch panel respectively by mistake, the possibility that at least some of the image displayed on the respective touch panel are interchanged and displayed can be reduced.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 145 to cause the processor module 145 to perform specified operations. Such instructions, generally referred to as "computer program code" or "program code" (which may be grouped in the form of computer programs or other groupings), when executed, enable a display control method of the mobile phone 100/200/400.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way.

Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile device, comprising:
  a first display screen operable to receive a first touch motion thereon by a user;
  a second display screen related to the first display screen, and operable to receive a second touch motion thereon by the user, the first touch motion comprising dragging a touch on the first display screen toward the second display screen and the second touch motion comprising dragging a touch on the second display screen toward the first display screen; and
  a processor operable to interchange the first display screen with the second display screen whereby only a part of an image of the first display screen is displayed on the second display screen and an entire image of the second display screen, at a same magnification, is displayed on the first display screen when the first touch motion and the second touch motion are detected at the same time, wherein the first touch motion and the second touch motion comprise a pinching operation, wherein the first display screen operable to receive the first touch motion and the second display screen operable to receive the second touch motion, and the first touch motion performed by one of an index finger and a thumb of the user, and the second touch motion performed by the other of the index finger and the thumb of the user, wherein the processor operable to enlarge the part of an image of the first display screen which the first touch motion starts touching on the first display screen and display the enlarged part of the image on the second display screen when the first display screen with the second display screen are interchanged.

2. The mobile device according to claim 1, wherein the first display screen comprises a text-editing screen for an e-mail, and the second display screen comprises a content of at least one of a document attached to or a document to be attached to the email.

3. The mobile device according to claim 1, wherein at least one of the first display screen and the second display screen, after interchanging the first screen with the second screen, is displayed differently from the at least one of the first and second display screen before interchanging the first display screen with the second display screen.

4. A method for controlling a display of a mobile device, the method comprising:
    displaying a first display screen;
    receiving a first touch motion on the first display screen;
    displaying a second display screen, which is related to the first display screen;
    receiving a second touch motion on the second display screen; and
    interchanging the first display screen with the second display screen whereby only a part of an image of the first display screen is displayed on the second display screen and an entire image of the second display screen, at a same magnification, is displayed on the first display screen when the first touch motion and the second touch motion are received at the same time and when the first touch motion comprises dragging a touch on the first display screen toward the second display screen, and the second touch motion comprises dragging a touch on the second display screen toward the first display screen, and combined the first touch motion and the second touch motion comprise a pinching operation;
    wherein the first display screen operable to receive the first touch motion and the second display screen operable to receive the second touch motion, and the first touch motion performed by one of an index finger and a thumb of the user, and the second touch motion performed by the other of the index finger and the thumb of the user;
    wherein the processor operable to enlarge the part of an image of the first display screen which the first touch motion starts touching on the first display screen and display the enlarged part of the image on the second display screen when the first display screen with the second display screen are interchanged.

5. The method according to claim 4, wherein the first display screen comprises a text-editing screen for an e-mail, and the second display screen comprises a content of at least one of a document attached to and a document to be attached to the email.

6. The method according to claim 4, wherein at least one of the first display screen and the second display screen, after interchanging the first screen with the second screen, is displayed differently from the at least one of the first display screen and second display screen before interchanging the first display screen with the second display screen.

7. A non-transitory computer readable medium comprising program code for operating a mobile device for displaying first and second screens, the program code comprising:
    displaying a first display screen;
    receiving a first touch motion on the first display screen;
    displaying a second display screen, which is related to the first display screen;
    receiving a second touch motion on the second display screen; and
    interchanging the first display screen with the second display screen whereby only a part of an image of the first display screen is displayed on the second display screen and an entire image of the second display screen, at a same magnification, is displayed on the first display screen when the first touch motion and the second touch motion are received at the same time and when the first touch motion comprises dragging a touch on the first display screen toward the second display screen, and the second touch motion comprises dragging a touch on the second display screen toward the first display screen, and combined the first touch motion and the second touch motion comprise a pinching operation;
    wherein the first display screen operable to receive the first touch motion and the second display screen operable to receive the second touch motion, and the first touch motion performed by one of an index finger and a thumb of the user, and the second touch motion performed by the other of the index finger and the thumb of the user;
    wherein the processor operable to enlarge the part of an image of the first display screen which the first touch motion starts touching on the first display screen and display the enlarged part of the image on the second display screen when the first display screen with the second display screen are interchanged.

8. The non-transitory computer readable medium according to claim 7, wherein the first display screen comprises a text-editing screen for an e-mail, and the second display screen comprises a content of at least one of a document attached to and a document to be attached to the email.

9. The non-transitory computer readable medium according to claim 7, wherein at least one of the first display screen and the second display screen, after interchanging the first screen with the second screen, is displayed differently from the at least one of the first display screen and second display screen before interchanging the first display screen with the second display screen.

* * * * *